(12) United States Patent
Pires Cabado et al.

(10) Patent No.: US 8,783,730 B2
(45) Date of Patent: Jul. 22, 2014

(54) FLANGES FOR WATERTIGHT COUPLING OF SMOOTH SURFACE PIPES

(76) Inventors: Elisabet Patricia Pires Cabado, Alella (ES); Barbara Ines Pires Cabado, Alella (ES)

( * ) Notice: Subject to any disclaimer, the term of this patent is extended or adjusted under 35 U.S.C. 154(b) by 282 days.

(21) Appl. No.: 13/033,921

(22) Filed: Feb. 24, 2011

(65) Prior Publication Data

US 2012/0217745 A1 Aug. 30, 2012

(51) Int. Cl.
*F16L 17/00* (2006.01)
(52) U.S. Cl.
USPC .............................. 285/105; 285/321; 285/340
(58) Field of Classification Search
USPC ......... 285/104, 373, 112, 340, 105, 232, 321, 285/317
See application file for complete search history.

(56) References Cited

U.S. PATENT DOCUMENTS

| | | | |
|---|---|---|---|
| 2,341,164 A * | 2/1944 | Shimek | 285/340 |
| 2,995,388 A * | 8/1961 | Morello, Jr. et al. | 285/340 |
| 3,837,687 A * | 9/1974 | Leonard | 285/111 |
| 6,161,880 A * | 12/2000 | Peppel | 285/340 |
| 2008/0012339 A1* | 1/2008 | Krausz et al. | 285/420 |

FOREIGN PATENT DOCUMENTS

| | | |
|---|---|---|
| ES | 235 619 | 4/1978 |
| ES | 1 000 365 | 3/1988 |
| ES | 1 000 372 | 3/1988 |
| ES | 1 000 615 | 3/1988 |
| ES | 2 009 481 | 9/1989 |
| ES | 2 117 502 | 8/1998 |
| ES | 2 138 497 | 1/2000 |
| GB | 1 462 886 | 1/1977 |
| GB | 1 582 858 | 1/1981 |

* cited by examiner

*Primary Examiner* — James Hewitt
*Assistant Examiner* — Jay R Ripley
(74) *Attorney, Agent, or Firm* — Michael J. Striker

(57) ABSTRACT

A flange assembly for a watertight coupling of smooth surface pipe includes a triple metal ring provided for anchoring and retention and having three unitary rings which are identical and form substantially an entirety of a circumference and a sheet on which the unitary rings are solidly joined and which constitutes a base of the triple ring. Each of the unitary rings is provided throughout an entirety of its inner edge with folds forming in their outer most part a succession of vertices. The unitary rings are configured to rest on a smooth outer surface of pipes and the vertices are driven into the smooth outer surface to prevent an axial displacement allowing an application of the triple ring, and to distribute a penetrating action so as to decrease a possibility of tearing and damage of the smooth outer surface of the pipes.

6 Claims, 1 Drawing Sheet

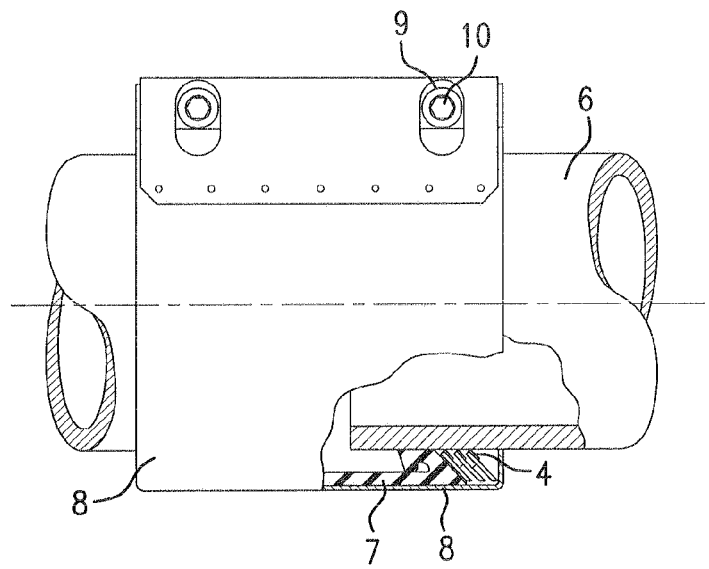
FIG.1
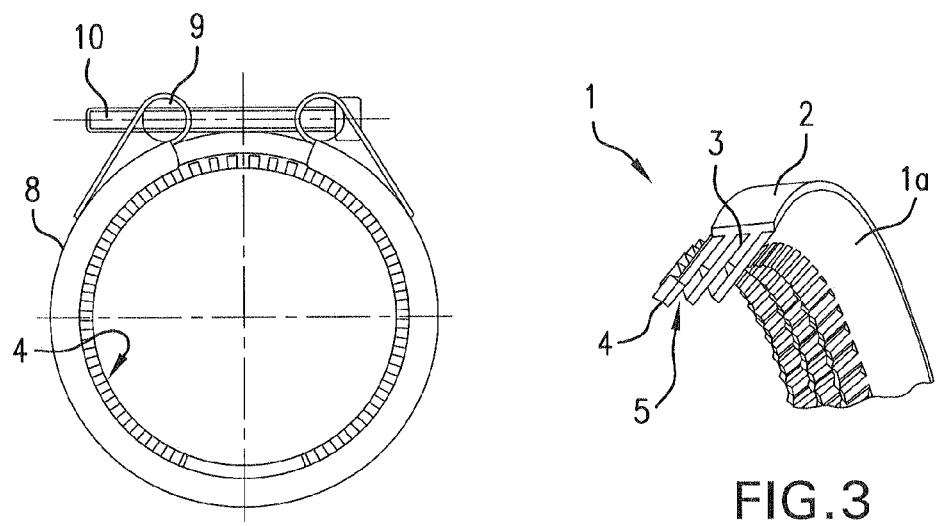
FIG.2
FIG.3
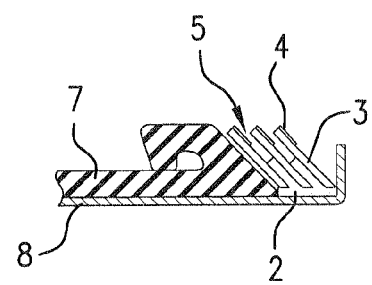
FIG.4

FLANGES FOR WATERTIGHT COUPLING OF SMOOTH SURFACE PIPES

BACKGROUND OF THE INVENTION

The present invention relates to flanges, in particular for application in a watertight coupling of high and low pressure fluid pipes, whose outer surface is totally smooth, without any ribs or edges.

In particular the present invention relates to a flange with improved fitting and tightening, which considerably increases the resistance of the flange to different stresses caused due to passage of a pressurized fluid inside a conduit that may cause axial displacement in the pipes specifically at their coupling point with one another, with a subsequent decoupling and risk of leaks, and which reduces possibilities of damage to the surface of the pipes.

Flanges for a watertight coupling of smooth end pipes are known. Some of them are disclosed in Spanish Utility Models 235,619; U8600595, U8600609, U8600639, in Spanish patents P8803941, P9401300 and P9601830, and in British patents 1,462,886 and 1,582,858.

They disclose flange-based devices provided with suitable elements that guarantee the necessary water-tightness as well as a correct and permanent securing of the ends of the pipes coupled. However, they do not have elements that guarantee the aforementioned when pipes having totally smooth outer surface must be coupled. This is an important factor which must be taken into consideration when pipes are composed of thermoplastic materials, such as polyvinylchloride (PVC) or polyethylene (PE) and the surface of the pipes if also relatively soft and may be damaged depending on the type of coupling flange used.

SUMMARY OF THE INVENTION

Accordingly, it is an object of the present invention to provide flanges for a watertight coupling of smooth surface pipes, which avoid the disadvantages of the prior art.

In keeping with these objects and with others which will become apparent hereinafter, one feature of the present invention resides in that in a flange a triple ring is used for anchoring or retention, composed of metal and having considerable resistance and elasticity, each of the unitary rings, parallel and identical, is equipped with a series of folds positioned throughout their interior perimeter, produced by die-casting and later folding, forming a triple circular assembly of protruding vertices that will rest, and, in practice, drive into the smooth surface of the ends of the pipes to couple using the flange, guaranteeing the ring seal, and the protruding vertices are disposed in position opposite the possible trajectory of movement of the pipes would follow should an accidental decoupling of the flange occurs.

The triple ring is solidly joined to a flat and circular base, coinciding in dimensions with the interior of the casing or protective rim of the flange, the place where the triple ring for anchoring and fastening is located. Essentially, the triple ring formed by the three identical unitary rings and a flat base to which they are solidly joined, is produced from a single metal piece and through a die-casting process, folded and cut, which profiles the form of each and every one of the ring vertices.

The flange provided with the above-mentioned new features and applied for the joint or coupling of two pipes and outer smooth surface, will offer a situation on the ends of the pipe to couple three identical assemblies of metal vertices which will rest on the smooth surface. The penetrating and retaining action on the vertices decreases in erythematic progression and reduce the risk of scratching and damage of the pipe surface, without decreasing due to this the capacity for total anchoring and retention of the flange.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view, partially sectioned, of a flange assembly situated in the ends of two coupled pipes, whose outer surface is smooth;

FIG. 2 is a front and suitably sectioned view of the closed flange in accordance with the present invention;

FIG. 3 is a perspective detail of a part of a triple ring for anchoring and retention in accordance with the present invention; and FIG. 4 is a cross section of the area of the flange where the new, improved elements of the present invention are applied.

DESCRIPTION OF THE PREFERRED EMBODIMENTS

A flange assembly for coupling ends of two pipes includes a triple metal ring which is identified with reference number (1) and provides anchoring and retention. The triple metal ring (1) has unitary rings which are identified with reference numeral (1a). Each of the unitary rings (1a) is circular and not closed throughout its circumference.

The unitary rings (1a) are solidly joined on a single part, by a flat base (2) of the ring (1), which constitutes a support surface corresponding to a width of a metal sheet with which the ring (1) is produced in its entirety.

Each of the unitary rings (1a) is produced by a die-casting, folding and cutting. Through the entirety of inner edges of the unitary rings (1a) folds (3) oriented toward an outside of the ring are configured, so as to form a series of vertices (4) in the outermost part of each fold (3), due to die-casting cuts (5). The vertices (4) will directly rest on a smooth outer surface (6) of a pipe.

The flange assembly in accordance with the present invention is completed by known elements forming the flange. These known elements include for example a ring seal (7) of a characteristic profile, outer rings (8) for covering and protection of the entire assembly equipped with closing elements composed generally of threaded bolts (9), and a corresponding through shafts (10) which guarantee the fitting of the triple ring (1) on the outer smooth surface (6) of the ends of the pipes, as well as of the ring seal (7).

It will be understood that each of the elements described above, or two or more together, may also find a useful application in other types of constructions differing from the types described above.

While the invention has been illustrated and described as embodied in a flange for a watertight coupling of smooth surface pipes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A flange assembly for a watertight coupling of smooth surface pipes, comprising:

a triple metal ring structure for anchoring and retention, said triple metal ring structure comprising:

three unitary rings which are identical and form substantially an entirety of a circumference, and a metal sheet in which said three unitary rings are solidly joined as a single part as a base of said triple ring structure, which base constitutes a support surface having a width equal to a width of the metal sheet with which said triple ring structure is produced in its entirety, said three unitary rings being parallel to one another and axially spaced from one another within said base, wherein each of said unitary rings is provided throughout an entirety of its inner edge with a succession of vertices, said vertices' profile being formed by folding and cutting each said respective unitary ring, said folds orientated towards an outside of each respective unitary ring, wherein each of said unitary rings are configured to rest on a smooth outer surface of a pipe, and wherein said vertices are configured to be driven into the smooth outer surface of the pipe to prevent an axial displacement allowing an application of said triple ring structure, and to distribute a penetrating action so as to decrease a possibility of tearing and damage of the smooth outer surface of the pipe.

2. A flange assembly as defined in claim 1, wherein each of said unitary rings is a unitary ring obtained by die-casting, folding and cutting.

3. A flange assembly as defined in claim 1, further comprising an outer enveloping ring, said sheet of said triple metal ring structure for anchoring and retention positioned and housed against an inner face of said outer enveloping ring.

4. A flange assembly as defined in claim 3, further comprising a ring seal located under said outer enveloping ring and positioning said triple metal ring structure.

5. A flange assembly as defined in claim 4, further comprising means for fastening and closure of the flange assembly solidly joining said outer enveloping ring, said triple metal ring structure and said ring seal.

6. A flange assembly as defined in claim 5, wherein said means for fastening and closure include threaded bolts and through shafts.

* * * * *